(12) United States Patent
Ross et al.

(10) Patent No.: US 11,361,600 B2
(45) Date of Patent: Jun. 14, 2022

(54) METHOD FOR AUTHENTICATING A DIAGNOSTIC TROUBLE CODE GENERATED BY A MOTOR VEHICLE SYSTEM OF A VEHICLE

(71) Applicant: Continental Teves AG & Co. oHG, Frankfurt am Main (DE)

(72) Inventors: Scott F. Ross, Steinbach (DE); Michael Gerhard Schneider, Eschborn (DE)

(73) Assignee: CONTINENTAL TEVES AG & CO. OHG

( * ) Notice: Subject to any disclaimer, the term of this patent is extended or adjusted under 35 U.S.C. 154(b) by 522 days.

(21) Appl. No.: 16/412,904

(22) Filed: May 15, 2019

(65) Prior Publication Data
US 2019/0355188 A1   Nov. 21, 2019

(30) Foreign Application Priority Data
May 17, 2018 (DE) ...................... 10 2018 207 791.6

(51) Int. Cl.
*G07C 5/08* (2006.01)
*H04L 9/40* (2022.01)

(52) U.S. Cl.
CPC .......... *G07C 5/0808* (2013.01); *G07C 5/085* (2013.01); *G07C 5/0816* (2013.01); *H04L 63/0876* (2013.01)

(58) Field of Classification Search
CPC .... G07C 5/0808; G07C 5/0816; G07C 5/085; H04L 63/0876; H04L 9/3226; H04L 9/3239; H04L 2209/84; H04L 63/123; H04L 67/12
See application file for complete search history.

(56) References Cited

U.S. PATENT DOCUMENTS 5,050,080 A * 9/1991 Abe ...................... G07C 5/0808
701/29.2
6,604,032 B1  8/2003 Möller
(Continued)

FOREIGN PATENT DOCUMENTS

CN       103713527 A  *  4/2014
DE        69814844 T2      5/2004
(Continued)

*Primary Examiner* — Maceeh Anwari
*Assistant Examiner* — Jacob Daniel Underbakke
(74) *Attorney, Agent, or Firm* — RatnerPrestia

(57) ABSTRACT

A method for authenticating at least one diagnostic trouble code (DTC) generated by a motor vehicle system of a vehicle. The method generates a DTC by a fault detection algorithm, stores the DTC in a volatile fault memory, generates an identity marker denoting the fault detection algorithm at the time of generation of the DTC, stores the identity marker in NVM, stores the DTC in the NVM when an ignition-off request signal is present, loads the DTC from the NVM into the volatile memory when an ignition-on request signal is present, and authenticates the DTC by the authentication data record by, initially by determining the fault detection algorithm by which the fault event was detected, subsequently this fault detection algorithm being compared with the fault detection algorithm indicated by the identity marker, and an absence of concordance resulting in a manipulation of the DTC being indicated.

5 Claims, 1 Drawing Sheet

(56) References Cited

U.S. PATENT DOCUMENTS

| | | | |
|---|---|---|---|
| 8,406,951 B2* | 3/2013 | Suganuma | G06F 11/006 |
| | | | 701/33.4 |
| 9,705,678 B1* | 7/2017 | Wang | H04L 63/1466 |
| 2008/0148827 A1* | 6/2008 | Keski-Hynnila | G01M 15/05 |
| | | | 73/114.31 |
| 2010/0004814 A1* | 1/2010 | Nagata | F02D 41/22 |
| | | | 701/31.4 |
| 2016/0234204 A1* | 8/2016 | Rishi | H04L 63/0428 |
| 2017/0096958 A1* | 4/2017 | Jiang | F02D 41/221 |
| 2017/0126663 A1* | 5/2017 | Blass | H04L 9/00 |
| 2017/0161965 A1* | 6/2017 | Du | G06F 11/36 |
| 2018/0054639 A1* | 2/2018 | Rosqvist | H04N 21/432 |
| 2018/0067811 A1* | 3/2018 | Mowatt | G06F 11/142 |

FOREIGN PATENT DOCUMENTS

| | | | | |
|---|---|---|---|---|
| DE | 102009020854 A1 | 12/2009 | | |
| WO | WO-2018045241 A2 * | 3/2018 | | G06K 9/6284 |

* cited by examiner

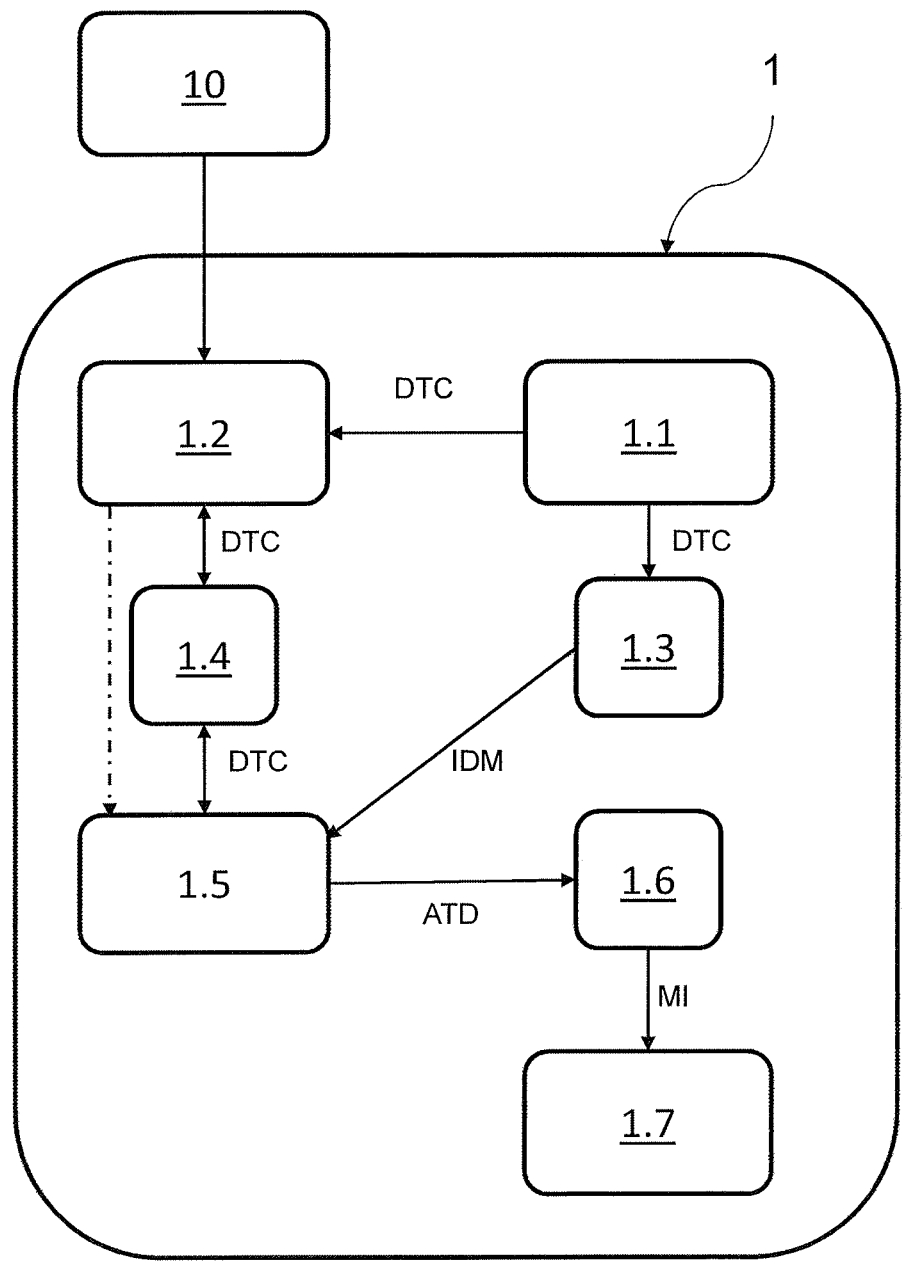

METHOD FOR AUTHENTICATING A DIAGNOSTIC TROUBLE CODE GENERATED BY A MOTOR VEHICLE SYSTEM OF A VEHICLE

CROSS REFERENCE TO RELATED APPLICATION

This application claims priority to German Patent Application No. 10 2018 207 791.6, filed May 17, 2018, the contents of such application being incorporated by reference herein.

FIELD OF THE INVENTION

The invention relates to a method for authenticating at least one diagnostic trouble code (DTC), generated by a motor vehicle system of a vehicle, in the event of at least one defined fault event in the motor vehicle system.

BACKGROUND OF THE INVENTION

Modern vehicles comprise one or more computer systems that, as an electronic control unit (ECU), control and monitor the operating cycles of numerous motor vehicle systems, such as drive machine, steering, transmission, brake system, air-conditioning system, safety system and driving assistance system. Furthermore, numerous sensors are installed in such vehicles, which send measurement data for controlling these motor vehicle systems to the control units. Such motor vehicle systems, including associated algorithms and sensors, are susceptible to faults, failures and interference. Therefore, electronic control units of this kind have diagnosis units that monitor the applicable motor vehicle systems and ascertain fault states. When such a fault state of a motor vehicle system is ascertained, a fault code, for example a diagnostic trouble code (DTC), is generated that is initially stored in a volatile memory (RAM) and, after the ignition of the vehicle is switched off, is stored in a nonvolatile memory (EEPROM) during a follow-up phase. After the end of the write phase in the nonvolatile memory, the ECU is disconnected from the terminal 30 and at the same time the volatile memory having the DTCs is erased.

The disadvantage of this method is that when the ECU is powered down the consistency between the latest fault information in the volatile memory and the fault information stored in nonvolatile fashion in the nonvolatile memory is lost. There is thus the risk of a wireless communication device of the vehicle or OBD socket of the vehicle being able to be used to perform a hacker attack on a vehicle bus, for example with the aim of changing or manipulating the data content of the nonvolatile memory.

After the ignition is switched on again or after a "wake-up" by a vehicle bus (for example CAN bus), the fault information stored in the nonvolatile memory is loaded into the volatile memory again as an input for the motor vehicle system. This input is used by the motor vehicle system as information about fault states that are already present or exist, which needs to be preserved until this fault state is confirmed again by a diagnosis function in the latest ignition cycle.

Manipulation of this fault information therefore cannot be detected.

SUMMARY OF THE INVENTION

An aspect of the invention is a method by means of which the consistency of the DTCs stored in a nonvolatile memory is testable.

Such a method for authenticating at least one diagnostic trouble code, generated by a motor vehicle system of a vehicle, in the event of at least one defined fault event in the motor vehicle system is distinguished according to an aspect of the invention by the following method steps:
a) generating a diagnostic trouble code by means of a fault detection algorithm on occurrence of the fault event in the motor vehicle system,
b) storing the diagnostic trouble code in a volatile fault memory,
c) generating an identity marker using the still image data denoting the fault detection algorithm at the time of the generation of the diagnostic trouble code,
d) storing the identity marker in a nonvolatile fault memory,
e) storing the diagnostic trouble code in the nonvolatile fault memory when an ignition-off request signal, which forms an authentication data record together with the identity marker, is present,
f) loading the diagnostic trouble code from the nonvolatile fault memory into the volatile fault memory when an ignition-on request signal is present, and
g) authenticating the diagnostic trouble code by means of the authentication data record by virtue of
g1) initially that fault detection algorithm by means of which the fault event indicated by the diagnostic trouble code is detectable being determined,
g2) subsequently this fault detection algorithm being compared with the fault detection algorithm indicated by the identity marker, and
g3) an absence of concordance resulting in a manipulation of the diagnostic trouble code being indicated.

This method according to an aspect of the invention involves a diagnostic trouble code together with an identity marker being stored as an authentication data record, wherein this identity marker is based on still image data that indicate those conditions under which this diagnostic trouble code has been generated, i.e. that fault detection algorithm by means of which the indicated fault event is detectable is specified.

A diagnostic trouble code that is generated by means of a vehicle-external source, for example improperly by a customer service tester, and stored in a fault memory is not based on a vehicle-internal monitoring process, which is why the storage process for this diagnostic trouble code is improper.

The method according to an aspect of the invention prevents malicious manipulation of the behavior of the motor vehicle system via a vehicle-external source. In addition, the storage of incorrect data that do not correspond to applicable still image data at the time of generation of the diagnostic trouble code is prevented.

According to an advantageous development of an aspect of the invention, the identity marker is generated as a token by means of a cryptographic algorithm. By way of example, this can involve a hash value (fingerprint) for the code of the fault detection algorithm being calculated, which is compared by means of a stored hash value (fingerprint) at another storage location and hence ensures that the fault detection algorithm itself has not been changed.

A further advantageous refinement of an aspect of the invention provides for a source marker to be generated that indicates whether the diagnostic trouble code is generated by means of a vehicle-external source, wherein the authentication data record is generated from the diagnostic trouble code, the identity marker and the source marker.

Such a source marker can achieve the advantage that the diagnostic trouble code storage and the method for diagnostic trouble code storage are logged explicitly. This serves to log them independently of one another, in order to be able to detect a later external manipulation of the diagnostic trouble code or of the detection method.

A last advantageous refinement of the method according to an aspect of the invention provides for c1) a fault reaction to be provided for the fault event indicated by means of the diagnostic trouble code, and c2) the identity marker to be generated by additionally using the data denoting the fault reaction.

BRIEF DESCRIPTION OF THE DRAWINGS

The method according to an aspect of the invention is described below on the basis of exemplary embodiments with reference to a single accompanying FIGURE, which shows a block diagram to explain the method according to an aspect of the invention.

DETAILED DESCRIPTION OF THE PREFERRED EMBODIMENTS

The FIGURE shows a schematically indicated motor vehicle system 1 (for example a brake system) of a vehicle, wherein only the components relevant to the method are depicted. Further, this FIGURE shows a garage tester 10 connected to a diagnostic module 1.2 that undertakes the communication with the connected garage tester 10 and the execution of commands of the garage tester 10, such as e.g. the reading of a fault memory in a RAM store 1.4 (cf. the FIGURE) of an ECU.

A fault detection algorithm 1.1 embodied as a software component is used to monitor the functions of the motor vehicle system 1, and the presence of a defined fault event of the motor vehicle system results in a diagnostic trouble code DTC that indicates this fault event being output. This diagnostic trouble codes DTC is firstly stored in a volatile fault memory (RAM) 1.4 by means of the diagnostic module 1.2 and secondly supplied to a memory (RAM) 1.3. The memory 1.3 is further used, at the time of generation of the diagnostic trouble code DTC, to store the still image data denoting the fault detection algorithm 1.1. From the diagnostic trouble code DTC and the still image data, an identity marker IDM is generated that is stored in a nonvolatile fault memory (EEPROM) 1.5.

The identity marker IDM is generated as a token by means of a cryptographic algorithm. This means that a hash value (fingerprint) for the code of the fault detection algorithm is calculated, which is compared by means of a stored hash value (fingerprint) at another storage location and hence ensures that the fault detection algorithm itself has not been changed.

It is also possible to provide a fault reaction for the fault event indicated by means of the diagnostic trouble code DTC and to generate the identity marker by additionally using the data denoting the fault reaction.

If an ignition-off request signal is present, for example if the ignition is switched off by means of the ignition lock of the vehicle, the diagnostic trouble code DTC from the volatile fault memory 1.4 is stored in the nonvolatile fault memory 1.5 and an authentication data record ATD is formed from the diagnostic trouble code DTC and the identity marker IDM.

It is also possible to produce this authentication data record ATD using a further data record referred to as a source marker QM. This source marker QM indicates whether the diagnostic trouble code DTC has been generated by means of a vehicle-external source, that is to say for example using the customer service tester 10. This information is supplied by the diagnostic module 1.2 directly to the nonvolatile fault memory 1.5 and stored therein. In this case, the authentication data record ATD consists of three data sections, namely the diagnostic trouble code DTC, the identity marker IDM or the applicable token and the source marker QM.

Such an authentication data record ATD (with or without source marker QM) is used to test the consistency of the diagnostic trouble code DTC with the identity marker IDM or with the identity marker IDM and the source marker QM, i.e. the authentication of the diagnostic trouble code DTC is performed.

The authentication of the diagnostic trouble code DTC is performed by means of an authentication unit 1.6 when an ignition-on request signal is present, that is to say when the ignition is switched on by means of the ignition lock, by virtue of initially that fault detection algorithm by means of which the fault event indicated by that diagnostic trouble code DTC that is loaded into the volatile memory 1.4 is detectable being determined. Subsequently, this fault detection algorithm is compared with the fault detection algorithm 1.1 indicated by the identity marker IDM, and an absence of concordance results in a manipulation of the diagnostic trouble code DTC being supplied to a manipulation handling unit 1.7 by means of manipulation information MI.

The manipulation handling unit 1.7 is used so as, in the event of a manipulated diagnostic trouble code DTC, that is to say an inadmissible entry for a diagnostic trouble code DTC of this kind, to compare the entered fault for plausibility for the stored detection method. If the applicable information is not plausible, it seems reasonable to suspect manipulation of the diagnostic trouble code in the nonvolatile fault memory 1.5.

The invention claimed is:

1. A method for authenticating at least one diagnostic trouble code, generated by a motor vehicle system of a vehicle, in the event of at least one defined fault event in the motor vehicle system, wherein the method comprises:
   a) generating a diagnostic trouble code by a first fault detection algorithm on occurrence of the fault event in the motor vehicle system,
   b) storing the diagnostic trouble code in a volatile fault memory,
   c) generating an identity marker, by implementing a cryptographic algorithm on both the diagnostic trouble code and a fault detection data including the first fault detection algorithm at a time of the generation of the diagnostic trouble code,
   d) storing the identity marker in a nonvolatile fault memory,
   e) storing the diagnostic trouble code in the nonvolatile fault memory when an ignition-off request signal, which forms an authentication data record together with the identity marker, is present,
   f) loading the diagnostic trouble code from the nonvolatile fault memory into the volatile fault memory when an ignition-on request signal is present, and
   g) after step (f), authenticating the diagnostic trouble code by the authentication data record by:
      g1) determining a second fault detection algorithm based on the loaded diagnostic trouble code,
      g2) comparing the second fault detection algorithm to the first fault detection algorithm indicated by the identity marker, and g3) authenticating the diagnostic trouble code when the comparison indicates that the first fault detection algorithm matches the second fault detection algorithm.

2. The method as claimed in claim 1, in which the identity marker is generated as a token by a cryptographic algorithm.

3. The method as claimed in claim 1, in which a source marker is generated that indicates whether the diagnostic trouble code is generated by a vehicle-external source, wherein the authentication data record is generated from the diagnostic trouble code, the identity marker and the source marker.

4. The method as claimed in claim 1, in which
   c1) a fault reaction is provided for the fault event indicated by the diagnostic trouble code, and
   c2) the identity marker is generated by additionally using the data denoting the fault reaction.

5. The method as claimed in claim 2, in which a source marker is generated that indicates whether the diagnostic trouble code is generated by a vehicle-external source, wherein the authentication data record is generated from the diagnostic trouble code, the identity marker and the source marker.

\* \* \* \* \*